United States Patent

[11] 3,581,965

[72] Inventor Kenneth J. Shaver, Jr.
  Houston, Tex.
[21] Appl. No. 853,639
[22] Filed Aug. 28, 1969
[45] Patented June 1, 1971
[73] Assignee AMF Incorporated
  New York, N.Y.

[54] PIPE ALIGNMENT AND DRIVE APPARATUS
  7 Claims, 3 Drawing Figs.
[52] U.S. Cl. ........................................ 226/177,
  226/184, 198/127
[51] Int. Cl. ........................................ B65h 17/18
[50] Field of Search ............................. 198/127;
  226/176, 180, 181, 182, 184, 177, 192

[56] References Cited
UNITED STATES PATENTS
3,371,770  3/1968  Graham et al. ............... 226/176X
3,510,042  5/1970  Romere ........................ 226/184X Primary Examiner—Joseph Wegbreit
Assistant Examiner—Bruce H. Stoner, Jr.
Attorneys—George W. Price and John H. Gallagher ABSTRACT: Apparatus for engaging an elongated object such as a pipe and maintaining it accurately aligned along an alignment axis as the pipe moves through the apparatus. Apparatus receives pipe of any diameter within a range of diameters. Rollers which engage opposite sides of pipe are continuously driven from the same power source without need for adjustment of drive mechanism because of change of position of rollers should the pipe diameter change.

INVENTOR.
KENNETH J. SHAVER, JR.
BY
*John H. Gallagher*
ATTORNEY

INVENTOR.
KENNETH J. SHAVER JR.

BY

*John H. Gallagher*
ATTORNEY

PIPE ALIGNMENT AND DRIVE APPARATUS

BACKGROUND OF THE INVENTION

In the nondestructive testing of elongated members such as steel pipes it is the customary practice to pass the sections of pipe axially through the inspection apparatus. The inspection apparatus usually is constructed about an axis along which the pipe is to pass. There are a number of reasons why it is necessary to maintain the pipe centered as accurately as possible along the desired alignment axis. Often the pipe is magnetized by means of magnetic pole pieces which are fixed in position relative to the axis. The accuracy of interpreting the test data requires that the pipe by magnetized to a desired state of magnetization and that all portions of all sections of pipe being inspected by magnetized as uniformly as possible. If the positions of the pipes being inspected change with respect to the magnetizing pole pieces, variations in the magnetization states of the pipes can occur and resulting variations in test data can lead to errors or confusion in interpreting the test data. Further, it is common to have a number of magnetic flux field detectors contact the pipe as it passes through the inspection apparatus. If the pipe is not accurately centered on the alignment axis all detectors may not make good contact with the pipe surface and this can give rise to erroneous inspection data. Additionally, the abrasive wear of the pipe on the detectors always is a problem and if the pipe-centering apparatus does not maintain the pipe accurately centered on the alignment axis the wear on some of the detectors may become excessive.

The tubular goods that are used and reused in the oil fields commonly have couplings, flanges, or other types of enlargements on at least one end of the pipes. It is desirable that the complete length of each section of pipe be inspected in a continuous operation without the requirement to stop the axial movement of the pipe when the enlarged end approaches the inspection apparatus. This requires that the pipe centering apparatus be able to pass the enlarged end of the pipe and that the accurate axial alignment by maintained.

SUMMARY OF THE INVENTION

The above-recited requirements for a pipe-centering apparatus are provided by the apparatus of the present invention which is comprised of two pantograph type mechanisms or frames which are symmetrically disposed on opposite sides of the desired alignment axis. Each pantograph frame has a configuration comprised of two parallelograms, one disposed vertically over the other, and it operates to expand and contract in the vertical direction with its outermost pivot joints moving away from and toward the alignment axis as the frame expands and contracts. The outermost pivot joints of each frame are pivotally connected to the ends of respective pivot arms whose opposite ends are connected to a fixed pivot joint whose axis is normal to and intersects the alignment axis. The fixed pivot joints associated with the two frames are equidistantly spaced from the alignment axis. Respective axle rods extend between the corresponding outermost pivot joints of the two frames and each rod carries a roller which has a contoured surface that engages the pipe surface. Means fixed to each of the frames is engaged by a respective fixed guide slot in a support structure to keep each frame symmetrically positioned with respect to a horizontal plane through the alignment axis for, irrespective of the positions of the rollers, i.e., for all conditions of expansion and contraction of the two frames. Means are provided to urge the rollers into contact with the pipe surface, and means are provided to continuously drive the rollers with rotary motion so as to impart the desired axial motion to the engaged pipe. The drive mechanism is continuously operable to drive both rollers with equal force irrespective of the position of the rollers with respect to the alignment axis and irrespective of the movement of the rollers over a pipe end of changing diameter.

DETAILED DESCRIPTION

Figure 1:
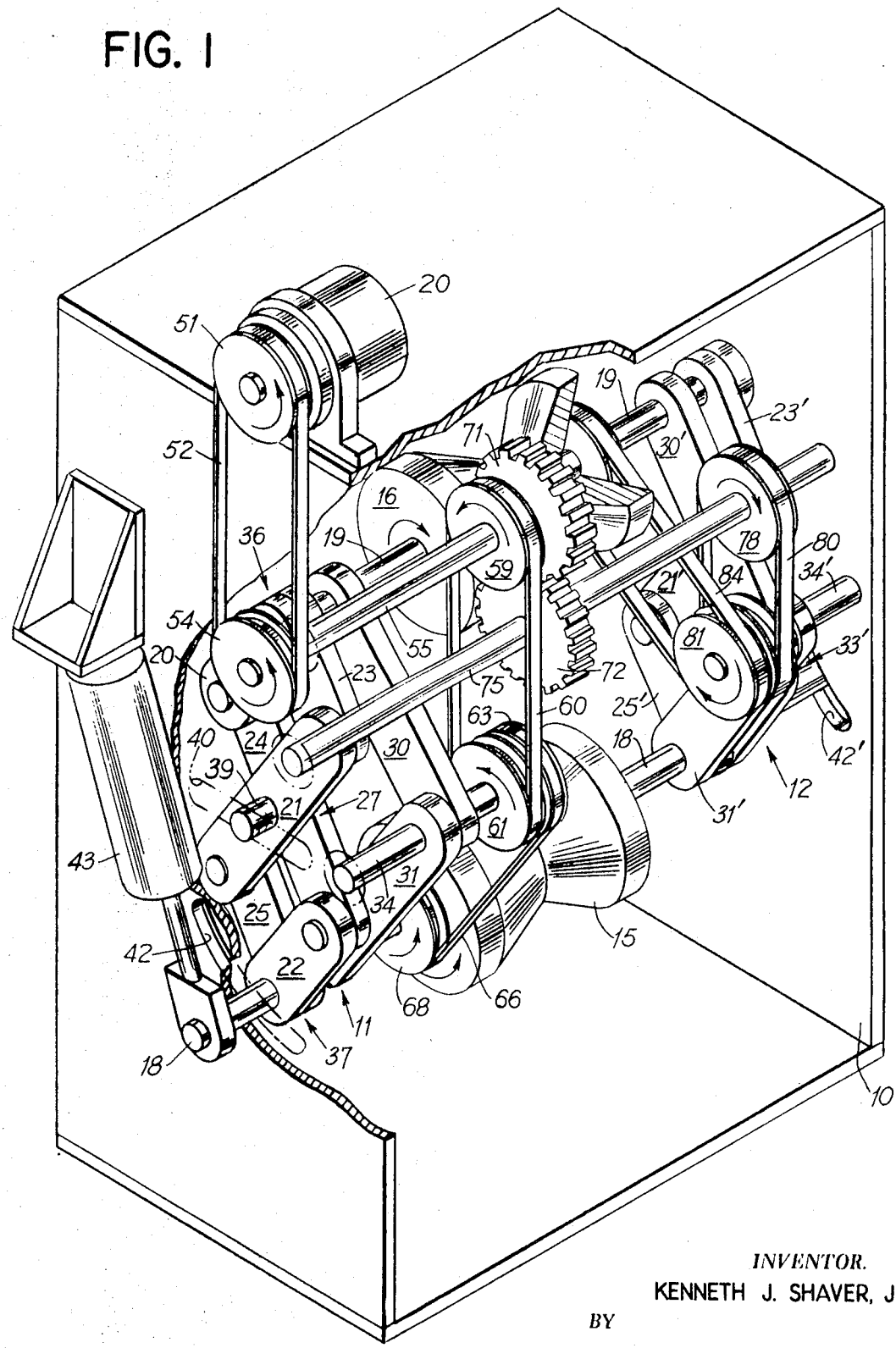
FIG. 1 is a perspective illustration of power driver pipe aligning or centering apparatus of this invention.

The pipe-centering apparatus of this invention is illustrated in FIG. 1 and includes a rigid support structure 10 which is fixed in position and which supports the adjustable centering apparatus and the mechanism for driving the rollers that move the pipe through the centering apparatus. The centering apparatus is comprised of first and second substantially identical pantograph frames 11 and 12 which are symmetrically positioned on opposite sides of an alignment axis along which the pipe is to pass. Rollers 15 and 16 have V-shaped notches in their cylindrical surfaces to engage a pipe of any diameter within a wide range of diameter and maintain it centered on the alignment axis. The rollers are rotatably supported on respective roller axles 18 and 19 which extend between the two pantograph frames 11 and 12 and which are free to move with respect to frame 10. Rollers 15 and 16 are rotated by a motor 20 which is fixed to frame 10 and a drive mechanism, which will be described later, to impart a translatory motion to a piece of pipe to move the pipe through the centering apparatus and through the nondestructive testing apparatus which would be located just to the left of support 10 as viewed in FIG. 1.

For a clear understanding of the construction and operation of the substantially identical pantograph frames 11 and 12 reference will now be made to FIG. 2 which is a simplified illustration of frame 11. Similar reference numerals are used in FIGS. 1 and 2 to designate corresponding parts of frame 11, and the corresponding parts of frame 12 are designated by primed numerals in FIG. 1. Frame 11 is comprised of a first set of three parallel bars 20, 21, and 22 and a second set of three parallel bars 23, 24, and 25 which are arranged transversely to the first set. In the arrangement of this mechanism the ends of various bars are pivotally joined together to form a two-parallelogram configuration. The center bars 21 and 24 are joined at their midregions by a pivot joint 27. Pivot arms 30 and 31 are joined together at their right ends by a fixed pivot joint 33 and are respectively pivotally joined at their other ends to the respective outermost pivot joints 36 and 37. Referring to FIG. 1, it is seen that fixed pivot 33 is fixed with respect to support 10 by virtue of an axle pin 34 which is secured to the sidewall of support 10. The midregion pivot joint 27 has a follower stud 39 that extends outwardly from the frame and is received within a horizontal guide slot 40 which is machined in the sidewall of support 10. The roller axles 18 and 19, FIG. 1, extend between the two frames 11 and 12 and also comprises the pins of the outermost pivots joints 36 and 37. Still referring to FIG. 1, axle 18 extends through arcuate guide slot 42 in the side of frame 10 and is connected to the displacement rod of an actuating piston 43 attached to frame 10.

Referring again to FIG. 2, frame 11 may expand and contract in height, and in doing so the outermost pivot joints 36 and 37 follow arcuate paths by virtue of being pivotally connected to pivot arms 30 and 31 which pivot about fixed pivot joint 33. The follower stud 39 at the midregion pivot joint 27 is restrained in its movement by horizontal slot 40 so that it may follow only a rectilinear movement parallel to the alignment axis. The functioning of the follower stud 39 and guide slot 40 serves to maintain the frame centered and symmetrical with respect to the alignment axis so that rollers 15 and 16 always are equidistant from the alignment axis, and always exert equal force on a pipe, thereby assuring the centering of a pipe engaged by the rollers.

The pantograph frame 12 is substantially identical in construction and operation to frame 11 just described. The two frames 11 and 12 are linked together by roller axles 18 and 19 so that rollers 15 and 16 move in unison the same distances toward or away from the alignment axis. Additionally, the actuating cylinders 43 and 43' (not illustrated) operate simultaneously to apply equal forces to axle rod 18, thereby to urge rollers 15 and 16 toward or away from each other and into or out of engagement with a pipe.

The operation of the actuating cylinders, such as cylinder 43, is controlled by an operator at his operating station. The hydraulic or pneumatic system associated with the actuating cylinders is designed so that sufficient force is applied to rollers 15 and 16 to firmly center a pipe on the alignment axis but yet there is sufficient give or resiliency in the system to permit the rollers 15 and 16 to follow, or ride over, collars, flanges, or other types of enlargements that commonly are included on the ends of pipes. Because follower stud 39 is fixed to frame 11 and is restrained by slot 40 to move only horizontally, any vertical component of displacement imparted to axle 18 by the displacement rod of actuating piston 43 produces a motion within the frame 11 that results in a horizontal movement of stud 39, and a vertical displacement of axle 19 that is equal to that of axle 18. That is, if axle 18 is moved a given distance toward the alignment axis, stud 39 will move to the left, and axle 19 will move the same given distance toward the alignment axis. It is to be understood that axles 18 and 19 actually move in arcuate paths whose center of curvature is the axis of fixed pivot joint 33.

Figure 3:
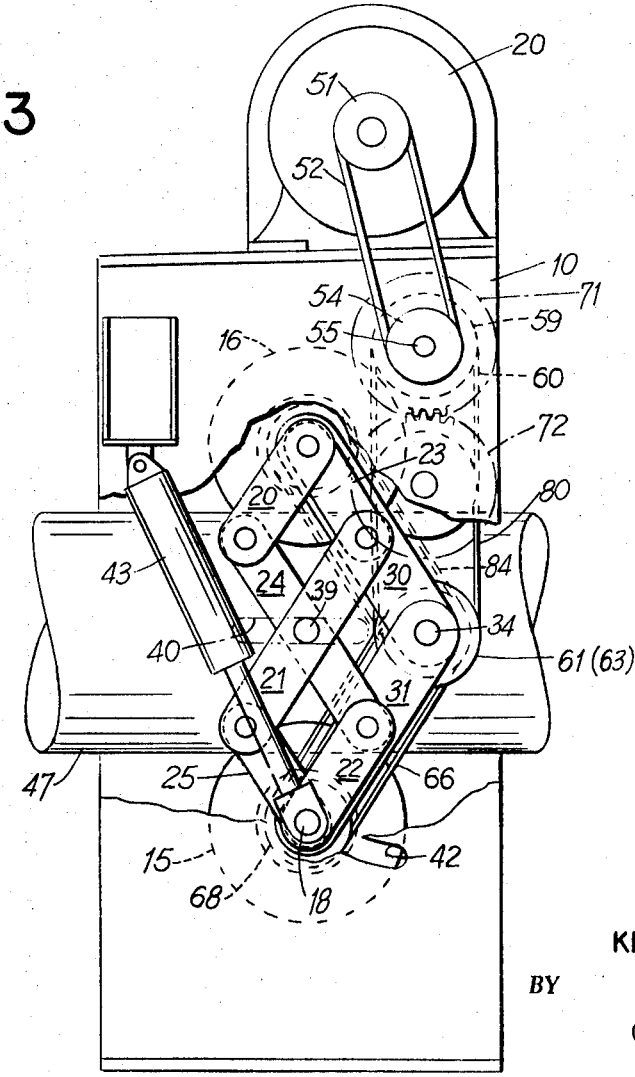
FIG. 3 is a simplified side view of the apparatus of FIG. 1 showing a section of a pipe engaged by the apparatus.

FIG. 3 is an illustration showing a pipe 47 engaged by rollers 15 and 16 and centered on the alignment axis. For centering pipes of different diameters the pantograph frame will expand or contract, and because stud 39 may move only horizontally within slot 40 the frame and rollers 15 and 16 always will remain symmetrical with respect to the alignment axis.

The pipe to be inspected for defects must be moved axially through the centering or alignment apparatus just described. To accomplish this movement the rollers 15 and 16 both are continuously driven in a manner to apply equal axially directed drive force to the pipe and this is accomplished in a manner that eliminates any need to make adjustments in the drive mechanism to compensate for the different positions that the rollers will be in when passing different sized pipes, or when the rollers move over collars or other diameter variations at the ends of the pipe.

Referring now to FIGS. 1 and 3, the drive motor 20 is fixed to the top surface of support 10 and has a pulley 51 which drives the drive belt 52. The belt is engaged at its lower end by pulley 54 which is secured to the left end a driven shaft 55 that passes through and is rotatably supported in the sidewall of support 10 by suitable bearing means. Shaft 55 does not extend completely between the sidewalls of support 10 but terminates to the left of the alignment axis, as viewed in FIG. 1, in order not to be in the way of a pipe passing through the rollers. Shaft 55 has a second pulley 59 near its right end and a belt 60 extends between pulley 59 and a pulley 61 that is rotatably mounted on the axle pin 34 on which the fixed pivot joint 33 also is mounted. A second pulley 63 is rotatably mounted on axle pin 34 and is fixed with respect to pulley 61 so that both rotate together. Pulleys 61 and 62 could of course by a single pulley having two belt grooves therein. Pulley 63 drives a belt 66 which in turn drives a pulley 68 that is mounted on axle 18 and fixed to roller 15, thereby imparting rotary motion to roller 15.

Tracing back through the drive system for roller 15 it will be seen that all of the pulley axles are fixed with respect to support 10 except axle 18. Because axle 18 moves in an arcuate path with the axle pin 34 as the center of curvature of the path, pulley 68 on axle 18 may be continuously driven by pulley 61 on axle pin 34 and constant tension will be maintained on belt 66 irrespective of the location of axle 18. That is, in essence, roller 15 is driven from the fixed pivot joint 33 about which it is free to move to engage the surface of a pipe.

The top roller 16 is rotated in the opposite rotary direction, i.e., the same tangential direction at its point of contact with pipe 47, by mechanism now to be described. Gears 71 and 72 mounted respectively on axles 55 and 75, pick off the rotary motion of driven axle 55 and transmit it to axle 75 which is rotatably supported by the opposite sidewalls of support 10. The pulley 78 which is fixed to axle 75 near its right-end drives belt 80 which engages one groove in double grooved pulley 81, thereby to rotate that pulley in the direction indicated in FIG. 1. Pulley 81 is rotatably mounted on the fixed axle pin 34' on which is carried the fixed pivot joint 33' of pantograph frame 12, this being the fixed center or curvature of the arcuate path through which the upper roller axle 19 is free to move. Belt 84 rides in the second groove of pulley 81 and drives the pulley 85 that is rotatably mounted on roller axle 19 and fixed with respect to roller 16, thereby to rotate roller 16 in the direction indicated. Again it is seen that roller 16 is driven from the fixed pivot joint 33' so that it always is equidistant from its power takeoff point.

From the above description it will be seen that the pipe engaging rollers 15 and 16 are continuously powered from the same source and both rotate at the same rate. This is true irrespective of the diameter of the pipe they may be engaging so long as the diameter is within a range of diameters which may be accommodated within the limits of movement of the pantograph frames 11 and 12.

Figure 2:
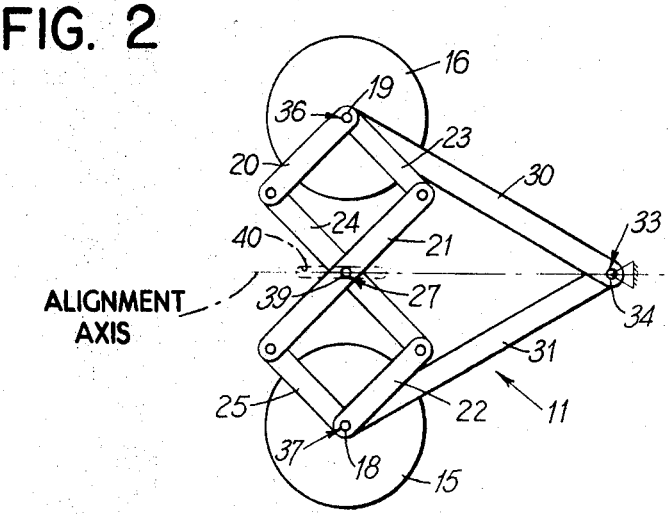
FIG. 2 is a simplified illustration of a pantograph frame that is included in the apparatus of FIG. 1.

It may be desirable in some instances to provide adjustable stops at the left end of the slot 40, FIGS. 1—3, to stop the movement of stud 39 and thus prevent the centering mechanism from contracting beyond a certain position. This will hold rollers 15 and 16 spaced apart a certain distance which will be sufficient to receive a pipe of known diameter. This feature is useful when many pipes of the same diameter rare to be handled.

In place of the belts and pulleys illustrated, chains and sprockets, or other suitable power-transmitting means may be substituted so long as the above-described principles are followed.

What is claimed is:

1. Adjustable-power-driven apparatus for centering and translating an elongated object along a horizontal axis comprising, first and second parallel pantograph frames symmetrically disposed on opposite sides of said horizontal axis, both frames being adapted to vertically expand and contract in length, each frame including at its central portion two bars that cross each other at their respective midregions, respective follower means fixed to central portion of each of said frames, fixed guide means engaging the respective follower means for defining a path of movement of the follower means that is parallel to the horizontal axis, first and second pivot means each pivotally engaging the topmost and bottommost portions of a respective frame and pivotally connected to respective fixed pivot joints displaced from the frames in a direction parallel to the horizontal axis, said pivot joints having a common pivot axis that is normal to the intersects said horizontal axis, whereby the topmost and bottommost portions of the frames are restrained in movement to arcuate paths whose centers of curvature all of coincident with said common axis, first and second object engaging rollers rotatably supported, respectively, between the topmost and bottommost portions of the two frames and centered with respect to the horizontal axis, means for expanding and contracting said frames in the vertical direction to move said rollers in unison away from the toward said horizontal axis, first and second power takeoff means operable about said common axis, means for transmitting rotary motion from the two power takeoff means to the respective rollers, and means for transmitting power from a fixed location removed from said power takeoff means to impart a rotary motion to said power takeoff means.

2. A centering device for elongated objects comprising, a first pantograph frame disposed on one side of an alignment axis along which an elongated object is to pass, said frame having a two-parallelogram configuration and being adapted to expand and contract along a translatable axis that is normal to and is placed from said alignment axis, first and second pivot arms each pivotally joined at one of its ends to a fixed pivot joint that is on a third axis which is normal to and intersects said alignment axis, said pivot arms each being pivotally joined at its opposite end to a respective one of oppositely disposed outer portions of the frames that are on said translatable axis, a second pantograph frame, a second fixed pivot joint, and a second pair of pivot arms connected similarly to the first-named ones and positioned symmetrically with said first-named ones on the opposite side of the alignment axis, first and second object-engaging rollers rotatably supported by means extending, respectively, between corresponding outer portions of the two frames, said rollers being centered with respect to a plane which passes through said alignment axis and which is normal to said third axis, means for expanding and contracting said frames whereby their outermost points move in paths along their respective translatable axes and the translatable axes move longitudinally with respect to said alignment axis, means for guiding the motion of said frames to restrict the movements of the outermost portions of the frames to arcuate circular paths whose center of curvature are their respective fixed pivot joints, power transmission means associated with each of said fixed pivot joints for transmitting power to the respective rollers to rotate the rollers and thereby impart linear motion to an object on said alignment axis that is engaged by the rollers.

3. The combination claimed in claim 2 wherein said power transmission means includes respective roller drive means rotatably engaging said rollers and free to pivot about said third axis.

4. The combination claimed in claim 3 wherein the roller drive means comprises respective endless belts or chains rotating about respective driven pulley means that rotates about said third axis.

5. The combination claimed in claim 4 and including power drive means carried on fixed support means and coupled to said respective driven pulleys to transmit rotary motion thereto.

6. A centering device for elongated objects comprising, a first set of three elongated bars disposed parallel to each other and arranged in spaced relationship in a direction transverse to their direction of elongation, a second set of three elongated bars arranged in similar relationship to each other and disposed transversely to said first set, the bars of the two sets being appropriately joined by pivot joints to from a pantograph frame consisting of a two-parallelogram configuration, the middle bars of the two sets crossing each other at their respective midregions and being pivotally joined thereat, the pivot joints joining corresponding ends of the first and third bars of said sets being outermost pivot joints that are aligned with said midregion pivot joint along a first axis for any condition of expansion or contraction of the pantograph frame, first and second pivot arms each having one end pivotally connected to a respective one of the outermost pivot joints of the frame and having their other ends pivotally joined together at a fixed pivot that lies on a second axis normal to said first axis, a second pantograph frame, a second pair of pivot arms and a second fixed pivot joint arranged substantially identically to the above-described frame, pivot arms and fixed pivot joint and being symmetrical thereto on the opposite side of an alignment axis that is parallel to said second axis, first and second roller axles extending, respectively, between the corresponding ones of said outermost pivot joints of the two frames, object-engaging rollers carried on said roller axles for engaging and centering an elongated object on said alignment axis, follower means fixed to the midregion pivot joint of each of said frames, fixed guide means engaging the respective follower means for restricting the movement of said midregion pivot joints to paths parallel to said alignment axis, means for expanding and contracting said frames, whereby said rollers move in unison by equal distances away from the toward said alignment axis.

7. The combination claimed in claim 6 and including means for rotating said rollers on the roller axles to move an elongated object in engagement therewith along said alignment axis.